United States Patent [19]
Rue et al.

[11] Patent Number: 5,152,810
[45] Date of Patent: * Oct. 6, 1992

[54] BONDED ABRASIVE TOOLS WITH COMBINATION OF FINELY MICROCRYSTALLINE ALUMINOUS ABRASIVE AND A SUPERABRASIVE

[75] Inventors: Charles V. Rue, Petersham; Leonard G. Pukaite, West Boylston; Krishnamoorthy Subramanian, Groton, all of Mass.

[73] Assignee: Norton Company, Worcester, Mass.

[*] Notice: The portion of the term of this patent subsequent to Jul. 31, 2007 has been disclaimed.

[21] Appl. No.: 717,761

[22] Filed: Jun. 19, 1991

Related U.S. Application Data

[63] Continuation-in-part of Ser. No. 532,412, Jun. 4, 1990, Pat. No. 5,090,970, which is a continuation-in-part of Ser. No. 243,284, Sep. 9, 1988, Pat. No. 4,944,773, which is a continuation-in-part of Ser. No. 95,781, Sep. 14, 1987, abandoned.

[51] Int. Cl.$^5$ .............................................. B24D 3/02
[52] U.S. Cl. ........................................ 51/309; 51/295; 51/278; 51/308
[58] Field of Search ................... 51/295, 298, 308, 309

[56] References Cited

U.S. PATENT DOCUMENTS

| | | | |
|---|---|---|---|
| 2,979,414 | 4/1961 | Ryshkewitch et al. | 51/309 |
| 3,437,468 | 4/1969 | Seafert | 51/309 |
| 3,940,276 | 2/1976 | Wilson | 51/309 |
| 3,944,398 | 3/1976 | Bell | 51/307 |
| 4,314,827 | 2/1982 | Leitheiser et al. | 51/309 |
| 4,543,107 | 9/1985 | Rue | 51/308 |
| 4,623,364 | 11/1986 | Cottringer et al. | 51/309 |
| 4,741,743 | 5/1988 | Narayanan et al. | 51/309 |
| 4,883,501 | 11/1989 | Haynes, Jr. | 51/309 |
| 4,944,773 | 7/1990 | Rue et al. | 51/307 |
| 5,090,970 | 2/1992 | Rue et al. | 51/309 |

Primary Examiner—William R. Dixon, Jr.
Assistant Examiner—Willie J. Thompson
Attorney, Agent, or Firm—David Bennett

[57] ABSTRACT

Abrasive tools with a mixture of more than 9% but less than about 65% superabrasive and from about 56% down to 0.5% of a microcrystalline alumina in a bond material show surprising advantages.

21 Claims, No Drawings

BONDED ABRASIVE TOOLS WITH COMBINATION OF FINELY MICROCRYSTALLINE ALUMINOUS ABRASIVE AND A SUPERABRASIVE

CROSS REFERENCE TO RELATED APPLICATION

This application is a continuation in part of application Ser. No. 07/532,412 filed Jun. 4, 1990, now U.S. Pat. No. 5,090,970 which is a continuation in part of application Ser. No. 07/243,284 filed Sept. 9, 1988, (now U.S. Pat. No. 4,944,773), which is a continuation in part of application Ser. No. 95,781 filed Sept. 14, 1987 (now abandoned).

TECHNICAL FIELD

This invention relates to bonded abrasive tools, particularly grinding wheels, comprising generally discrete, size graded abrasive grits mixed with a distinct continuous bonding material such as a glass, a cured resin, or a metal. Some of the abrasive grits are superabrasives such as diamond or cubic boron nitride ("CBN"). The CBN may be either monocrystalline or polycrystalline. CBN is both significantly harder and significantly more expensive than such conventional abrasives as alumina, zirconia-alumina, and silicon carbide.

TECHNICAL BACKGROUND

Superabrasives, such as CBN, generally cost about one hundred to one thousand times as much per unit volume as other conventional abrasives but nevertheless are cost effective in grinding certain materials such as tool steels.

CBN is used predominantly in grit sizes from about 100-400 for precision grinding processes. In general in the prior art the total grinding performance of a tool containing CBN has been found to correlate closely with the volume fraction of CBN in the tool, although a certain amount of porosity in a grinding wheel containing CBN is usually desirable. Conventional abrasives have been used together with other superabrasives in abrasive tools in the prior art, but the conventional abrasive in such products has functioned primarily as a kind of diluent and has contributed little if anything as an abrasive to the total cutting tool life when the tool was used on hard work pieces such as tool steels. For example, Makhlouf et al. U.S. Pat. 4,652,277 of Mar. 24, 1987 refers to the use of silicon carbide and alumina to help make the coefficients of thermal expansion of the rim and core regions as close to each other as possible in a grinding wheel containing CBN in the rim region only, but there is no suggestion that these conventional abrasive materials contribute directly as abrasives to the cutting performance of the wheel.

When dealing with expensive abrasives such as CBN it is a frequent expedient to form only the rim of a wheel from the expensive material. In the discussion that follows, the term "tool" will be used to denote any device designed for abrading and, in the context of grinding wheels will cover not only wheels of uniform construction but will also, for wheels of non-uniform construction, describe that peripheral portion of the wheel that contains the abrasive formulations of the invention. Thus even metal single layer., (often called MSL), wheels where the "tool" comprises a single layer of abrasive particles adhered to the rim of a wheel by a metal bond are included. In such cases however it is usual to refer to the proportions of the surface area covered by the abrasive rather than the volume of the tool represented by that abrasive component. Generally a wheel in which the maximum density of abrasive particles has been incorporated into the MSL is referred to as a 100% wheel even though the actual percentage of the surface area covered by the abrasive particles is only about 90%.

SUMMARY OF THE INVENTION

It has been found that the grinding effectiveness of bonded abrasive tools containing a given volume fraction of a superabrasive can be substantially enhanced in many applications by using a particular type of microcrystalline alumina, (herinafter referred to as MCA), abrasive grits along with the superabrasive.

The superabrasive used in the invention is selected from diamond and cubic boron nitride, known generally and hereafter in this specification as CBN. CBN is in fact the preferred superabrasive in the present invention.

The amount of superabrasive used in the tools of the present invention represents more than 9% and up to about 65% and more preferably from about 12 to about 50% of the volume of the tool. In some cases it is advantageous to metal coat the superabrasive before incorporation in the tool. The metal most frequently chosen is nickel but any other metal may be selected provided this does not significantly deteriorate the properties of the final tool.

The tools of the invention also comprise MCA in an amount that is from about 0.5% to less than about 56% and preferably from about 5% to about 50% of volume of the tool. The lower limit recited above is intended to cover anything more than an insignificant amount rather than a specific fixed lower limit. Obviously the greater the amount of MCA present, the greater the cost savings since MCA is significantly less expensive than superabrasive materials. These particles may also be metal coated if desired. Again a nickel coating is preferred.

When the tools are MSL tools, the proportions of the component CBN and MCA, expressed in terms of the percentage of the surface area of the tool occupied by the respective grits, are from more than 9% to less than 90%, and preferably from about 12% to about 50% of the CBN component and correspondingly from about 0.5% to less than 80%, and preferably from about 5% to about 50% of the surface area of the tool.

Up to about 45% of the volume of the MCA can be replaced with other aluminous abrasive materials, such as coarse alumina lath shaped crystals believed to be formed by growth of some of the predominant finer crystallites, a spinel matrix with poorly defined grain boundaries or even by other aluminous abrasives such as a fused alumina or a fused alumina/zirconia.

DESCRIPTION OF THE PREFERRED EMBODIMENTS

MCA for use in this invention may be made by a variety of processes, preferably those processes described and claimed in U.S. Pat. Nos. 4,623,364; 4,314,827; and 4,744,802 which are hereby incorporated by reference. The grits made according to the first and third patents are made by mixing minor proportions, usually less than 5% by volume, of very fine crystalline seed particles with sols or gels containing hydrated forms of alumina, such as boehmite, and optionally also containing minor quantities of other oxides such as zirconia or titania or materials such as magnesia that can form spinels with part of the alumina content, then drying the seeded sol or gel and heating the dried seeded gel to an appropriate temperature for an appropriate time to generate the desired microstructure. The microstructure of the abrasive grits is preferably non-cellular. Sizing to abrasive grits can be accomplished before or after final heating, with the former preferred because it is easier.

Any effective seed material may be used as an alternative to the alpha alumina seeds taught explicitly by U.S. Pat. No. 4,623,364. In general suitable seed materials are isostructural with the alpha-alumina product desired, with the lattice parameters as close as possible to those of alpha alumina. These include materials such as ferric oxide for example. Any form of hydrated alumina sol or gel may be seeded, although the sols and seeds taught by Cottringer are generally preferred.

The preferred microcrystalline alumina is sometimes referred to as seeded sol-gel alumina to indicate the method by which it is preferably made. Such products are characterized by a microstructure, as revealed by examination at a magnification of 5,000-20,000 ×by light or electron microscopy, that predominantly comprises tightly packed, very fine crystals of alpha alumina or of an aluminum spinel such as magnesium aluminate. The predominant crystallites have maximum dimensions of no more than about 1 micron, preferably no more than about 0.7 microns, and still more preferably no more than about 0.3 micron. The predominant crystallites generally show little or no regular faceting at about 5,000 magnification and are approximately equi-axed, with no higher aspect ratio than 2, usually less than 1.5.

More generally the MCA abrasive grits for use in this invention have a crystal size that is less than about 10 microns and preferably less than about 1 micron. The grits preferably have a density of at least 90%, more preferably at least 95% of the theoretical density corresponding to their chemical analysis and preferably have a hardness of at least 16, more preferably of at least 18, still more preferably at least 19 gigapascals.

The microcrystalline aluminous grits and the CBN grits used together to this invention generally are mixed together with conventional bond ingredients, optionally including porosity formers, pressed into appropriate shapes, and heated to form grinding tools of approximately uniform composition throughout, all according to methods and practices conventional in the bonded abrasives arts. Bonds of any of the general types common in the art, such as glass or vitrified, resinoid, or metal (including electroplated), may be used effectively, as well as hybrid bonds such as metal filled resinoid bonds and resin impregnated vitrified bonds. All the known fillers, active and non-active, e.g. teflon, graphite, and silver as well as potassium sulfate, cryolite and kyanite, can be used in the abrasive tools of the invention. It is also possible to incorporate fillers into the bond material to limit the abrasion of the bond material when in use and to inhibit crack propagation through the bond structure. Typical fillers for this purpose include fine powders of abrasive materials such as alumina and silicon carbide, typically with a particle size significantly smaller than the CBN and MCA abrasive grits held by the bond material.

As indicated above, the mixed grits characteristic of this invention can be concentrated in the outer parts of a grinding tool, for example by entrapping the grits in metal accreted on a supporting surface by electroplating or by placing the mixed grits around the periphery of a brazing type metal alloy and then partially softening or melting the alloy in a vacuum furnace so that the grits sink into the alloy sufficiently to hold them in place when the tool is later cooled. As indicated above these are often referred to as MSL wheels.

The practice and value of the invention may be further appreciated from the following non-limiting examples.

EXAMPLE 1 AND COMPARATIVE EXAMPLE C1

These examples described grinding wheels made with a vitrified bond and containing seeded sol gel alumina and CBN abrasive grits. These are compared with wheels containing only CBN abrasive grits.

Two sets of wheels were made up, each with 48% by volume of abrasive grits. In one set the whole volume was provided by CBN grits and these were labelled "C-1". In the other set, (Example 1), a 150 grit, seeded sol gel, alpha alumina was used to provide 10.5% of the volume of the wheel, leaving 37.5 vol% of CBN.

Each wheel was made up with a vitreous bond available from Norton Co., Worcester, MA, with the designation "HA-6". The proportion of bond was 27 vol% and the pore space was 25 vol%.

The dimensions of all the wheels were 5"×⅜"×⅞". The wheels were each prepared and trued in the same manner 20 then used to grind an M7 steel workpiece with an Rc hardness of 63, using as coolant White & Bagley #1572 oil. After trueing, one 0.020 inch on diameter grind was made and the wheel wear and finish were measured. Then with no further trueing, three further 0.020 inch on diameter grinds were made and the wear and finish were measured after each. The results are set forth in Table 1. Each data point given is the average of four separate runs.

TABLE 1

| | Comparison of Ex. 1 and C 1 | | | | | |
|---|---|---|---|---|---|---|
| Wheel | Normal Force lb/in | MRR in 3/min. | WWR in. | G Ratio | Power HP/in | Surface Finish |
| 1 | 124 | 0.407 | 0.000264 | 1538.4 | 6.8 | 19.7 |
| | 176 | 0.545 | 0.000337 | 1616.7 | 9.8 | 14.8 |
| | 226 | 0.974 | 0.000841 | 1158 | 14.7 | 18.8 |
| C 1 | 125 | 0.317 | 0.000098 | 3246 | 6.5 | 15.6 |
| | 181 | 0.488 | 0.000319 | 1528 | 10.7 | 15.9 |
| | 222 | 0.936 | 0.001094 | 855.2 | 15.1 | 21.3 |

From the above data it can be seen that, while the mixture of sol gel alumina and CBN uses about the same, or less, power and force, after an initial period, it achieves significantly better G Ratios and in general, better finishes.

Thus, surprisingly, the blend of minor amounts of a sintered sol gel aluminous abrasive with CBN significantly improves the performance of a vitreous bonded wheel over one containing an equal amount of the premium CBN grit alone.

EXAMPLES 2-3 AND COMPARATIVE EXAMPLES C 2-C 4

These examples illustrate the application of the invention to grinding tools in which the grits are concentrated on the outside in essentially a single layer.

In these particular cases, the bond was a brazing alloy and was applied as follows:

1) Clean and sandblast preform, which is typically steel.
2) Apply layer of brazing paste onto preform. Braze layer thickness varies as a function of grit size, concentration, and grit exposure.
3) Sprinkle abrasive particles onto brazing paste.
4) Place part into vacuum furnace, $1 \times 10-4$ torr minimum.
5) Heat part to brazing temperature, corresponding to the brazing paste applied.
6) Cool part down in vacuum.

Part is complete except for cosmetic operations.

The brazing paste was a commercially available AWS BVAg-8b alloy modified to bond difficult to wet materials, such as, ceramic, diamond, CBN, etc.

All the types of grinding tools for these examples had the same volume percent total abrasive grits in the effective outer layers. The grits were all CBN for type C 2, half CBN-half 38A for type C 3, half CBN-half MCA for type 2, and three-quarters CBN-one-quarter MCA for type 3. The concentration of abrasive used in the MCA/CBN tests is expressed as 100%. This means the highest density achievable by the sprinkling method. Physically this correlates to about 75% of the abrasive sections' surface area being covered with abrasive, or in the case of 80 grit, approximately 1.4 ct/in. sq.

In the products of these examples, the grits protrude from the surface of the finished tool considerably more than in the grinding wheels described in all the proceeding example. This causes products of this type to have rapid initial cut and correspondingly rapid initial tool wear, and makes it very difficult to determine grinding tool volume losses accurately. The method of measuring performance was therefore changed for these examples: the volume of metal cut was measured along with the reduction in the tool diameter. Results are shown in Table 2.

TABLE 2

Comparison of Grinding Tool Wear and Volume of Metal Removed, Examples 2-3 and C 2-C 3

| Relative Cumulative Metal Volume Cut | Cumulative Tool Diameter Loss, Mm, for: | | | |
|---|---|---|---|---|
| | 2 | 3 | C 2 | C 3 |
| 3 | 0.101 | 0.101 | 0.096 | 0.123 |
| 4 | 0.104 | 0.140 | 0.103 | 0.182 |
| 6 | 0.121 | 0.173 | 0.121 | 0.177 |
| 9 | 0.127 | 0.203 | 0.127 | 0.208 |

Table 2 shows that Types 2 and C 2 are almost exactly comparable, while the others are inferior. Because Type 2 has only half as much CBN as Type C 2, Type 2 is clearly more economical.

EXAMPLE 4 AND COMPARATIVE EXAMPLE C 4

These examples illustrate the invention in grinding tools with resinoid bonds and testing in dry grinding. Comparative Example C 4 had 25 volume % of nickel coated CBN grits (designated below as "CB", for "coated borazon"), while Example 4 had the same amount of CBN but also 4.75 volume % of grit 100 MCA. The green state bond for both wheels consisted of:

| | |
|---|---|
| CBN + abrasive coating + sodium hexafluorosilicate | 47.0 vol % |
| Long flow phenolic resin + lime | 36.7 vol % |
| Liquid furfural | 2.3 vol % |
| Flake silver | 14.0 vol % |

The abrasive grits and the bond were mixed in a conventional manner for the manufacture of bonded abrasives, then loaded into steel molds and molded at about 160° C. at a pressure of about 40 megapascals for about 30 minutes to produce a final grinding wheel.

The wheels were tested at 3600 SFPM in grinding a work piece of A.I.S.I. type M-2 steel, hardened to Rockwell C 65, at five different fixed infeed dimensions as shown in Table 3.

TABLE 3

Relative G Ratios and Power Draws for Types 4 and C 4

| Infeed Depth, mm: | 0.025 | 0.076 | 0.127 | 0.178 |
|---|---|---|---|---|
| G Ratio of Type 4/ G Ratio of Type C 4: | 1.39 | 1.37 | 1.44 | 1.47 |
| Power Draw of Type 4/ Power Draw of Type C 4: | 1.21 | 1.20 | 1.11 | 1.05 |

Inasmuch as the ratio of G Ratios for the two types of wheels is always higher than the ratios of power draw rated, the wheel according to this invention has an operating advantage that increases with increasing infeed depth. Though the power draw is also increased for the wheels according to the invention, the increase in G Ratio is far greater, and therefore the advantage obtained far outweighs the relatively minor concomitant disadvantage.

EXAMPLE 5 AND COMPARATIVE EXAMPLE C 4

These examples illustrate the use of the invention in metal bonded wheels without exceptionally protruding abrasive grits in the outer section. Example 5 used both CBN and MCA abrasive grits in a volume ratio of 3:1, while Comparative Example C 4 had the same total volume of all CBN grits. The bond composition was 81.4% copper and tin powders with a wetting agent, then adding the abrasive grits and mixing again, pressing cold around a core at a pressure of about 330 megapascals to form a green wheel, and sintering the green wheel in a mixed nitrogen and hydrogen atmosphere to a final temperature of about 550° C. over a period of five hours to reach final temperature and three hours at final temperature. All the wheel making procedures, except for the use of mixed types of abrasive grits, were conventional in the art. In an average of two tests under the same conditions with each type of wheel, Type 5 had a G-Ratio 17% higher than Type C 4, while drawing about 10% less power. Type 5 is therefore preferable.

EXAMPLE 6 AND COMPARATIVE EXAMPLE C 4

These examples illustrate the use of the invention in a resinoid bonded wheel for grinding steel while cooling with oil. Example 6 was like Example 4, except that the total amount of abrasive grit was 25 volume %, of which one quarter was MCA grits and the balance CB.

Wheels of Type 6 were compared against wheels of Type C 4 in grinding A.I.S.I. Type M-2 steel, hardened to Rockwell C 65 hardness while cooling with oil at a low infeed rate. Type 6 had a G Ratio 45% higher than Type C 4, while drawing slightly less power.

EXAMPLES 7 AND 8

These examples are closely related to Example 5. The materials used are the same as in that Example, except that the MCA abrasive used was coated with nickel, by conventional electroless nickel plating, to give a thickness of coating corresponding to 54% of the weight of the coated abrasive grit. Except for this change, Example 7 was like Example 5, while Example 8 was like Example 7, except that the amounts of abrasive grit used provided 6.25 volume % MCA and 18.75 volume% CB. The relative performance of wheels of these types in dry grinding of the same steel as shown under Example 5 is shown in Table 4.

Comparison of the data in Table 4 with that in Table 3 shows that the advantage of this invention in this bond material is even more marked when the MCA grits are nickel coated. Wheels of types 7 and 8 were also tested in the same type of grinding test, except for the use of water soluble oil to cool the work piece during grinding. The G Ratio advantages of types 7 and 8 compared with type C 4 was considerably reduced from the level shown in Table 4, but did not disappear entirely.

What is claimed is:

1. An abrasive tool comprising abrasive particles dispersed in a bond material in which the abrasive particles comprise microcrystalline alumina and superabrasive, and in which the superabrasive provides greater than 9% to less than 65% of the volume of the tool and the microcrystalline alumina provides from about 0.5% to less than 56% of the volume of the tool.

2. An abrasive tool according to claim 1 in which the superabrasive particles provide from 20 to 45% of the volume of the tool.

3. An abrasive tool according to claim 1 in which the superabrasive provides from 40% to 80% of the total volume of the abrasive particles.

4. An abrasive tool according to claim 1 in which the microcrystalline alumina is a seeded sol gel alumina.

5. An abrasive tool according to claim 1 in which the superabrasive is CBN.

6. An abrasive tool comprising abrasive particles and a bond material in which the abrasive particles are provided by a mixture of CBN and seeded sol-gel alumina abrasive particles with the superabrasive providing from about 12% to about 50%, and the alumina providing from about 50% to about 5%, of the volume of the tool.

7. An abrasive tool according to claim 1 in the form of a wheel.

8. An abrasive tool according to claim 6 in the form of a wheel.

9. An abrasive wheel having hub and rim portions in which the rim portion is an abrasive tool according to claim 1.

10. An abrasive wheel having hub and rim portions in which the rim portion is an abrasive tool according to claim 6.

11. An abrasive tool according to claim 1 in which the bond is a vitreous material.

12. An abrasive tool according to claim 1 in which the bond is a resinous material.

13. An abrasive tool according to claim 6 in which the bond is a vitreous material.

14. An abrasive tool according to claim 6 in which the bond is a resinous material.

15. An abrasive wheel according to claim 9 in which the abrasive particles are held in a metallic bond.

16. An abrasive wheel according to claim 9 in which at least some of the abrasive particles are metal coated before being incorporated in the bond material.

17. An abrasive wheel according to claim 10 in which the abrasive particles are held in a metallic bond.

18. An abrasive wheel according to claim 10 in which at least some of the abrasive particles are metal coated before being incorporated in the bond material.

19. A metal single layer tool comprising a single layer of abrasive particles adhered by a metal to the surface of a metal wheel wherein the abrasive particles comprise a superabrasive and a microcrystalline alumina and wherein the superabrasive provides more than 9% but less than 90%, and the alumina provides from less than 80% down to about 0.5%, of the area of the layer.

20. A tool according to claim 19 in which the superabrasive is CBN,

21. A tool according to claim 19 in which the microcrystalline alumina is a seeded sol-gel alumina.

* * * * *